US009467576B2

(12) United States Patent
Baer et al.

(10) Patent No.: US 9,467,576 B2
(45) Date of Patent: Oct. 11, 2016

(54) METHOD OF COMMUNICATION BETWEEN IMS NODES

(75) Inventors: Anders Baer, Arsta (SE); Jan Dahl, Alvsjo (SE); David Khan, Johanneshov (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 97 days.

(21) Appl. No.: 14/356,149

(22) PCT Filed: Nov. 4, 2011

(86) PCT No.: PCT/EP2011/069412
§ 371 (c)(1),
(2), (4) Date: May 3, 2014

(87) PCT Pub. No.: WO2013/064192
PCT Pub. Date: May 10, 2013

(65) Prior Publication Data
US 2014/0307537 A1     Oct. 16, 2014

(51) Int. Cl.
| H04L 29/06 | (2006.01) |
| H04L 12/703 | (2013.01) |
| H04M 17/00 | (2006.01) |
| H04M 15/00 | (2006.01) |
| H04M 17/02 | (2006.01) |
| H04W 4/24 | (2009.01) |
| H04L 12/24 | (2006.01) |

(52) U.S. Cl.
CPC ........ *H04M 17/208* (2013.01); *H04L 41/0695* (2013.01); *H04L 65/1016* (2013.01); *H04L 65/1069* (2013.01); *H04L 65/80* (2013.01); *H04M 15/41* (2013.01); *H04M 15/43* (2013.01); *H04M 15/57* (2013.01); *H04M 15/63* (2013.01); *H04M 15/64* (2013.01); *H04M 15/83* (2013.01); *H04M 15/85* (2013.01); *H04M 15/854* (2013.01); *H04M 17/02* (2013.01); *H04W 4/24* (2013.01); *H04M 2017/248* (2013.01)

(58) Field of Classification Search
None
See application file for complete search history.

(56) References Cited

U.S. PATENT DOCUMENTS

| 7,424,102 B2 * | 9/2008 | Koskinen ................ H04L 12/14 370/352 |
| 2005/0047357 A1 * | 3/2005 | Benveniste ............. H04L 12/12 370/311 |

(Continued)

FOREIGN PATENT DOCUMENTS

| RU | 2369981 C2 | 10/2009 |
| WO | 2011038554 A1 | 4/2011 |
| WO | 2011060815 A1 | 5/2011 |

OTHER PUBLICATIONS

PCT International Search Report for PCT Application No. PCT/EP2011/069412, dated Sep. 20, 2012; 3 pages.

(Continued)

*Primary Examiner* — Phirin Sam
*Assistant Examiner* — Tarell Hampton
(74) *Attorney, Agent, or Firm* — NDWE LLP

(57) ABSTRACT

A method of communication between two nodes providing online charging functionalities in an IP Multimedia Subsystem (IMS) network is described, wherein a first node is configured to operate as a Charging Triggering Function (CTF) and wherein a second node is configured to operate as an Online Charging Service (OCS). The method may alleviate drawbacks stemming from low availability of the OCS.

13 Claims, 5 Drawing Sheets

(56) References Cited

U.S. PATENT DOCUMENTS

| | | | | |
|---|---|---|---|---|
| 2006/0114913 | A1* | 6/2006 | Cai | H04L 12/14 370/395.52 |
| 2007/0156413 | A1 | 7/2007 | Cai et al. | |
| 2008/0147551 | A1* | 6/2008 | Connelly | G06Q 20/10 705/44 |
| 2008/0205381 | A1* | 8/2008 | Zhu | G06Q 20/10 370/352 |
| 2010/0046424 | A1* | 2/2010 | Lunter | H04L 47/10 370/328 |
| 2011/0003579 | A1* | 1/2011 | Cai | G06Q 20/14 455/408 |
| 2011/0010581 | A1* | 1/2011 | Tanttu | G06F 9/5038 714/11 |
| 2011/0141947 | A1* | 6/2011 | Li | H04M 3/2281 370/259 |
| 2012/0237013 | A1* | 9/2012 | Li | H04L 12/14 379/114.15 |
| 2012/0295585 | A1* | 11/2012 | Khan | H04L 12/14 455/406 |
| 2015/0012415 | A1* | 1/2015 | Livne | G06Q 30/00 705/39 |

OTHER PUBLICATIONS

Written Opinion from the International Searching Authority for PCT Application No. PCT/EP2011/069412 dated Sep. 20, 2012; 8 pages.

PCT International Preliminary Report on Patentability for PCT Application No. PCT/EP2011/069412 dated Nov. 18, 2013; 13 pages.

Hakala, H. et al., "*Diameter Credit-Control Application*;" Network Working Group; RFC 4006; Aug. 1, 2005; 114 pages.

"3rd Generation Partnership Project; Technical Specification Group Services and System Aspects; Telecommunication Mgmt; Charging Mgmt; Diameter Charging Applications" (Release 11); 3GPP TS 32.299 V11.1.0; (Sep. 26, 2011); 150 pgs.; Mobile Competence Centre, 650, Route Des Lucioles; F-06921 Sophia-Antipolis Cedex; France. (XP050553989).

"3rd Generation Partnership Project; Technical Specification Group Services and System Aspects; Telecommunication Mgmt; Charging Mgmt; Diameter Charging Applications" (Release 10); 3GPP TS 32.299, V10.2.0, (Jun. 2011), 149 pgs.; (3GPP), Mobile Competence Centre, 650, Route Des Lucioles; F-06921 Sophia-Antipolis, Valbonne, France.

"3rd Generation Partnership Project; Technical Specification Group Services and System Aspects; Telecommunication Mgmt; Charging Mgmt; IP Multimedia Subsystem (IMS) Charging" (Release 11); 3GPP TS 32.260, V11.1.0, (Sep. 2011), 138 pgs.; (3GPP), Mobile Competence Centre, 650, Route Des Lucioles; F-06921 Sophia-Antipolis, Valbonne, France.

"3rd Generation Partnership Project; Technical Specification Group Core Network and Terminals; IP Multimedia call control protocol based on Session Initiation Protocol (SIP) and Session Description Protocol (SDP); Stage 3" (Release 11); 3GPP TS 24.229, V11.1.0 (Sep. 2011); 704 pages; (3GPP), Mobile Competence Centre, 650, Route Des Lucioles; F-06921 Sophia-Antipolis, Valbonne, France.

Rosenberg, J. et al., "*Session Initiation Protocol*;" Network Working Group; RFC 3261; Jun. 2002; 269 pages.

Calhoun, P. et al., "*Diameter Base Protocol*;" Network Working Group; RFC 3588; Sep. 2003; 147 pages.

"3rd Generation Partnership Project; Technical Specification Group Services and System Aspects; IP Multimedia Subsystem (IMS); Stage 2," (Release 11); 3GPP TS 23.228 V11.2.0; (Sep. 2011); 274 pgs.; (3GPP), Mobile Competence Centre, 650, Route Des Lucioles; F-06921 Sophia-Antipolis, Valbonne, France.

"3GPP TS 32.260, 3rd Generation Partnership Project; Technical Specification Group Services and System Aspects; Telecommunication management; Charging management; IP Multimedia Subsystem (IMS) charging (Release 10)," Jun. 2011, 136 pages, V10.4.0, 3GPP Organizational Partners, Valbonne, France.

Decision of Grant, RU Application No. 2014122551, dated Oct. 19, 2015, 6 pages.

* cited by examiner

METHOD OF COMMUNICATION BETWEEN IMS NODES

CROSS-REFERENCE TO RELATED APPLICATIONS

This application is a National stage of International Application No. PCT/EP2011/069412, filed Nov. 4, 2011, which is hereby incorporated by reference.

TECHNICAL FIELD

The present invention relates to a method of communication between two nodes providing online charging functionalities in an IP Multimedia Subsystem (IMS) network. In particular, it relates to a method of communication between a first node that is configured to operate as a Charging Triggering Function (CTF) and a second node that is configured to operate as an Online Charging Service (OCS).

BACKGROUND

IP Multimedia (IPMM) services provide a combination of voice, video, messaging, data, etc, within the same session. As the number of basic applications and the media which it is possible to combine increases, the number of services offered to the end users will grow, and the potential for enriching inter-personal communications experience will be improved. This leads to a new generation of personalised, rich multimedia communication services, including so-called "combinational IP Multimedia" services.

IMS is the technology defined by the Third Generation Partnership Project (3GPP) to provide IP Multimedia services over mobile communication networks. IMS provides features to enhance the end-user person-to-person communication experience through the integration and interaction of services. IMS allows enhanced person-to-person (client-to-client) as well as person-to-content (client-to-server) communications over an IP-based network. The IMS makes use of the Session Initiation Protocol (SIP) to set up and control calls or sessions between user terminals (or user terminals and application servers). The Session Description Protocol (SDP) carried by SIP signalling is used to describe and negotiate the media components of the session. Whilst SIP was created as a user-to-user protocol, IMS allows operators and service providers to control user access to services and to charge users accordingly. Other protocols are used for media transmission and control, such as Real-time Transport Protocol and Real-time Transport Control Protocol (RTP/RTCP).

Within an IMS network, Call Session Control Functions (CSCFs) perform processing and routing of signalling. CSCFs handle session establishment, modification and release of IP multimedia sessions using the SIP/SDP protocol suite. 3GPP TS23.228 describes the logical nodes P-CSCF, I-CSCF, S-CSCF, E-CSCF and BGCF. The S-CSCF conforms to 3GPP TS 24.229 and performs session control services for User Equipments (UEs). It maintains the session state to support the services, and performs the following functions:

- it acts as a registrar according to [RFC3261] at registration;
- it notifies subscribers about registration changes;
- it provides session control for the registered users' sessions;
- it handles SIP requests, and either services these internally or forwards them on to a further node; and
- it interacts with IMS Application Servers.

The S-CSCF performs SIP routing according to 3GPP routing procedures.

Most SIP sessions in an IMS, such as calls that are initiated by a UE, are subject to charging by the operator. The IMS architecture provides for two distinct charging models: offline charging, and online charging.

Online charging is based on a so-called pre-paid subscription model. Typically, a subscriber purchases a number of credits from an operator. If a SIP session is initiated by a SIP request sent from the subscriber's UE to the S-CSCF, the S-CSCF contacts an Application Server implementing a Charging Triggering Function (CTF). The CTF Function is described in 3GPP TS 32.260 and 3GPP TS 32.299. It supports charging for users making use of IMS infrastructure and services. The CTF node detects whether the requested session is subject to a charge or not. If the requested session is subject to a charge, the CTF node contacts an Online Charging System (OCS) node in which the subscriber's current credit is stored. If the subscriber's account holds sufficient credit for the SIP request to be granted, the OCS replies accordingly to the CTF, which grants the request. Similarly, if insufficient credit is available, the SIP request may be turned down, or the session may be granted to be established for a limited amount of time.

The CTF and OCS nodes implement the online charging functionalities for the IMS architecture. Communication between the CTF and OCS nodes takes place over the Ro interface described in 3GPP TS32.299, and is governed by the DIAMETER protocol. Specifically, the CTF sends DIAMETER Credit Control Request (CCR) messages, while the OCS replies in DIAMETER Credit Control Answer (CCA) messages. These messages are specified in RFC 4006.

Many developing countries deploying IMS architectures rely exclusively on an online charging infrastructure. Indeed, the technical infrastructure for setting up an online charging system for an IMS architecture is not as complex and costly as the technical infrastructure needed for setting up an offline charging system, in which users are billed retroactively for the services and infrastructure they have used over a period of time.

Problems do however arise when the communication link implementing the Ro interface, which is used to connect the CTF to the OCS, is not reliable. For example, a transaction request may arrive at the CTF node while the OCS is not available, due to the communication link between the CTF and the OCS being down. In case of an error during the handling of a Credit Control Request, the OCS sends a Credit Control Failure Handling Attribute-Value-Pair (AVP), as defined in RFC 4006, to the CTF. The AVP indicates either to CONTINUE with the requested session, to TERMINATE the requested session, or to RETRY and TERMINATE. The default behaviour, which is assumed by the CTF if the OCS sends no reply at all, is TERMINATE. The operator needs to configure the CTF so that is capable of deciding on whether to grant the request, assuming a default behaviour of CONTINUE, or to turn it down, without having access to the credit status of the subscriber who initiates the transactions.

In a conservative approach, the CTF may by default turn the session request down if the OCS is not available. This policy allows the operator to avoid any loss of revenue in case the subscriber's credit balance is indeed not high enough for the transaction to be granted. On the other hand, if the subscriber's credit balance is high enough for the transaction to be granted, the subscriber experiences poor service availability, as the transaction is not granted irrespective of the subscriber's credit balance.

In a less conservative approach, the CTF may grant the session to continue irrespective of the balance of the subscriber's credit if the OCS is not available. This policy leads to a high service availability, but may result in severe losses of revenue for the operator, in case the subscriber's credit balance is not high enough for the transactions to be granted.

According to existing and currently proposed IMS architectures, there is no easy way to configure a CTF node and/or an OCS node so as to address this unsatisfactory behaviour in an IMS online charging model.

SUMMARY

According to a first aspect of the present invention, there is provided a method of communication between two nodes providing online charging functionalities in an IP Multimedia Subsystem, IMS, network. A first node is configured to operate as a Charging Triggering Function, CTF, and a second node is configured to operate as an Online Charging Service, OCS. The method comprises the step of receiving, at the CTF node, a Session Initiation Protocol, SIP, request relating to a SIP session from a network node. Further, the method comprises providing a notification at the CTF node. The notification indicates that the OCS service is not available. If the notification includes an indication that CCR requests relating to the SIP session should be buffered, the method further comprises the step of storing Credit Control Request, CCR, information at the CTF node. The stored CCR information corresponds to said SIP session and is to be sent to the OCS. The CTF node stores it in a memory buffer. The CTF node handles requests relating to said SIP session, on assumption that the corresponding CCR requests have been granted. Further, the CTF node transmits said buffered CCR information to said OCS after being notified that the OCS is available. The method further comprises, at the OCS node, processing said previously buffered CCR information.

According to a second aspect of the present invention, there is provided a method of handling a Session Initiation Protocol, SIP, request at an IP Multimedia Subsystem, IMS, node configured to operate as a Charging Triggering Function, CTF. The method comprises the step of receiving, at the CTF node, a Session Initiation Protocol, SIP, request relating to a SIP session from a network node. Further, the method comprises providing a notification at the CTF node. The notification indicates that the OCS service is not available. If the notification includes an indication that CCR requests relating to the SIP session should be buffered, the method further comprises the step of storing Credit Control Request, CCR, information at the CTF node. The stored CCR information corresponds to said SIP session and is to be sent to the OCS. The CTF node stores it in a memory buffer. The CTF node handles requests relating to said SIP session, on assumption that the corresponding CCR requests have been granted. Further, the CTF node transmits said buffered CCR information to said OCS after being notified that the OCS is available.

According to a third aspect of the present invention, there is provided a method of handling a Credit Control Request, CCR, request at an IP Multimedia Subsystem, IMS, network node configured to operate as an Online Charging Service, OCS. The method comprises the step of receiving previously buffered CCR information from a CTF node. The method further comprises processing said previously buffered CCR information. Preferably, the OCS node may further send a notification to a Charging Triggering Function, CTF, indicating that the OCS service is not available.

The notification of unavailability may preferably be transmitted from the OCS node to the CTF node.

More preferably, the notification of unavailability may be transmitted by means of a Credit Control Answer, CCA, reply and it may comprise an indication that CCR requests relating to the SIP session should be buffered.

Advantageously, the CCA reply may comprise a CONTINUE_BUFFER indication.

The buffered CCR information may preferably be transmitted in at least one CCR request including an indication that the information has been buffered.

According to a fourth aspect of the present invention, there is provided an apparatus comprising a first node configured to operate as a Charging Triggering Function, CTF, in an IP Multimedia Subsystem, IMS network. The apparatus comprises a first receiving unit for receiving SIP requests, a second receiving unit for receiving CCA replies, a first transmission unit for sending SIP messages, a second transmission unit for sending CCR requests; a memory configured to buffer CCR information, and a processing unit. The processing unit is configured to generate CCR information corresponding to a received SIP request and relating to a SIP session. Conditional on the provision of a notification indicating that an OCS service is unavailable and that CCR requests relating to the SIP session should be buffered, the processing unit is configured as follows. It is configured to store said CCR information in the buffer. The processing unit is furthermore configured to handle SIP requests relating to said SIP session on assumption that said CCR requests are granted, and to read said CCR information from said buffer, prior to transmitting said CCR information in at least one CCR request to said OCS service when it is available.

Preferably, the processing unit may further be configured to include in said at least one CCR request comprising buffered information, which is transmitted to said OCS service, an indication that the information contained therein has been buffered.

According to a fifth aspect of the present invention, there is provided an apparatus comprising a second node configured to operate as an Online Charging Service, OCS, in an IP Multimedia Subsystem, IMS, network. The apparatus comprises a receiving unit for receiving CCR requests, a transmission unit for sending CCA replies, a memory and a processing unit. The processing unit is configured to process a CCR request relating to a SIP session, wherein the CCR request is received from a CTF node and comprises an indication that the included CCR information was buffered by said CTF node.

Preferably, the processing unit may further be configured to transmit a notification of unavailability in a reply to a CCR request received from a CTF.

More preferably, the processing unit may further be configured to transmit the notification of unavailability in a reply to a CCR request received from a CTF, by means of a Credit Control Answer, CCA, reply, which comprises an indication that CCR requests relating to said SIP session should be buffered.

The CCA reply may preferably comprise a CONTINUE_BUFFER indication.

Embodiments of the present invention allow to alleviate the problems incurred in an online charging system of an IMS architecture, when the communication link between the CTF and OCS is unreliable. Using the present invention, operators are enabled to uphold service availability without loss of revenue. Operators may use the Ro interface for both pre-paid and post-paid subscribers as their usage can be accounted for retroactively.

BRIEF DESCRIPTION OF THE DRAWINGS

Aspects of the present invention will now be further described, by way of example only, with reference to the accompanying figures.

DETAILED DESCRIPTION

As described above, there is a need for using the available infrastructure related to online charging more efficiently in an IMS architecture. Currently, if the connection between the CTF and OCS nodes, which implements the Ro interface, is unavailable, there is no way of establishing a SIP session for a subscriber, even though the subscriber may have a credit balance that would allow the session to be established.

According to the present invention, this problem is addressed, for example, by expanding the Credit Control Failure Handling Attribute Value Pair (AVP) with a new value. The new value indicates that the CTF should continue with the establishment of the requested session and buffer any Credit Control Requests (CCR) in relation with the requested session for later handling by the OCS. In the following description, the new value will be denoted as the CONTINUE_BUFFER indication.

In order to implement the invention according to the present invention, the CTF is provided with the capability of buffering CCR requests when a CONTINUE_BUFFER notification is received. Moreover, the CTF is provided with the capability of draining said buffer of CCR information at a later time, when the OCS is available again. The CTF drains the buffer by sending the previously generated CCR requests to the OCS, including an indication that they represent buffered, and therefore non real-time, requests. The OCS is further provided with the capability to handle CCR requests that are non real-time requests, and that include previously buffered CCR information.

Figure 1:
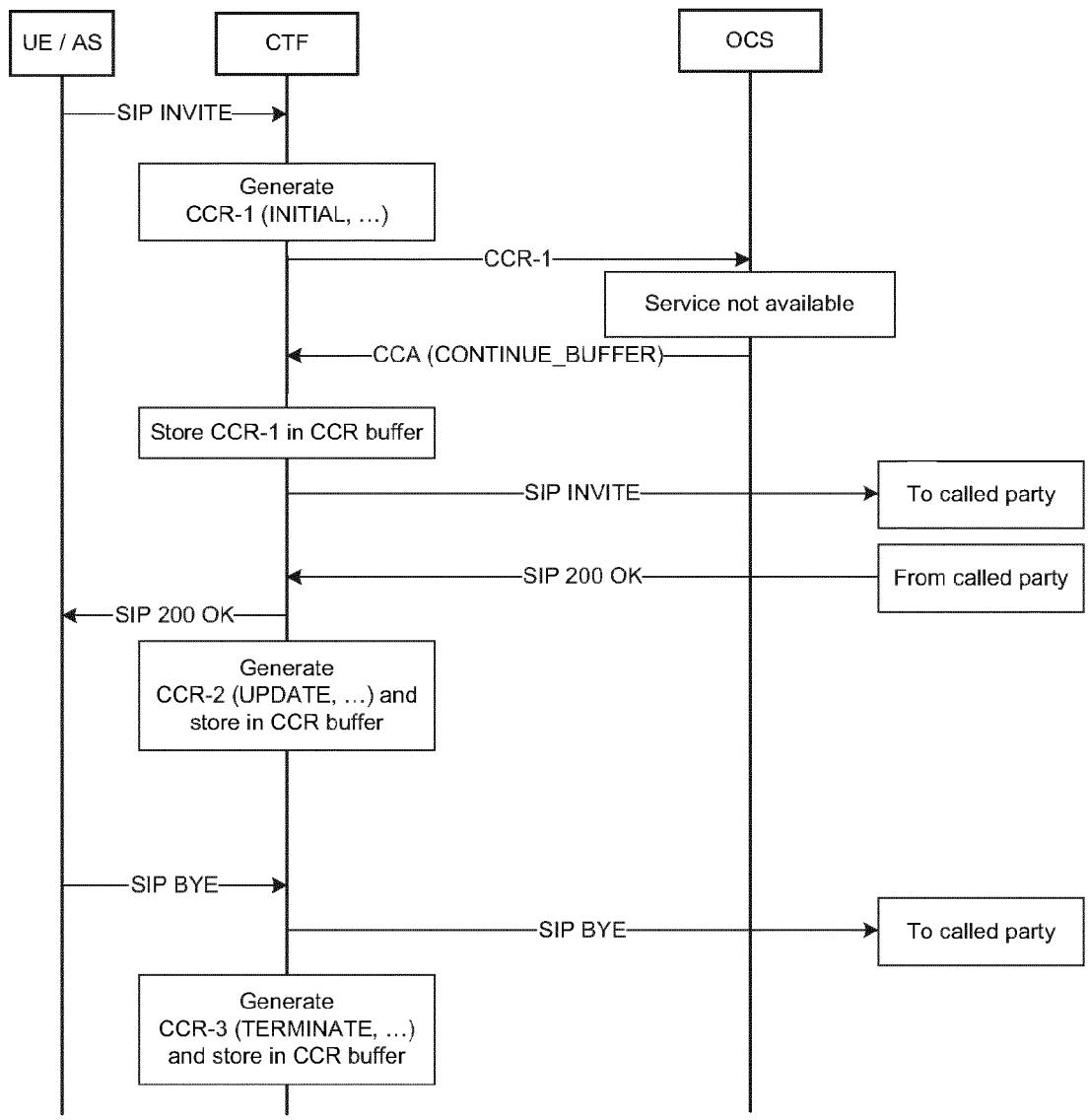
FIG. 1 shows signalling associated with a method according to an embodiment of the present invention.

The sequence of events for handling a CONTINUE_BUFFER AVP is indicated in FIG. 1.

A UE or AS requests the establishment of a new SIP session towards a called party. The corresponding SIP INVITE request is received by the CTF, possibly through a CSCF, which is not illustrated in FIG. 1. The CTF generates a first CCR, denoted as CCR-1, which includes the user identity of the requesting party, as well as the service information relating to the requested service. CCR-1 is transmitted over the Ro interface to the OCS, which keeps the subscriber's credit balance.

If the OCS is not available to provide service, for example because it is overloaded, it replies to the CTF using the new Attribute Value Pair CONTINUE_BUFFER. Furthermore, the operator may configure the CTF to use the CONTINUE_BUFFER indication as a default value whenever the OCS does not reply. Once a notification indicating the CONTINUE_BUFFER AVP is available at the CTF, it stores the previously sent CCR in a memory that is configured to hold CCR information relating to the requested session. This memory is referred to as a CCR buffer.

Assuming that the OCS has granted the corresponding CCR, the CTF forwards the SIP INVITE message to the called party, as is well known in the art. If the session is successfully established, a SIP 200 OK acknowledgement is received at the CTF from the called party, and forwarded by the CTF to the calling UE or AS. Upon establishment of the session, the CTF may, for example, generate a second CCR message that is to be transmitted to the OCS. CCR-2 includes information concerning the established session. As the CTF is aware that the OCS is unavailable, it stores CCR-2 in the CCR buffer.

Similarly, once the SIP session is terminated by a SIP BYE request, the CTF generates the corresponding CCR Termination request, CCR-3, and stores it in the CCR buffer.

Figure 2:
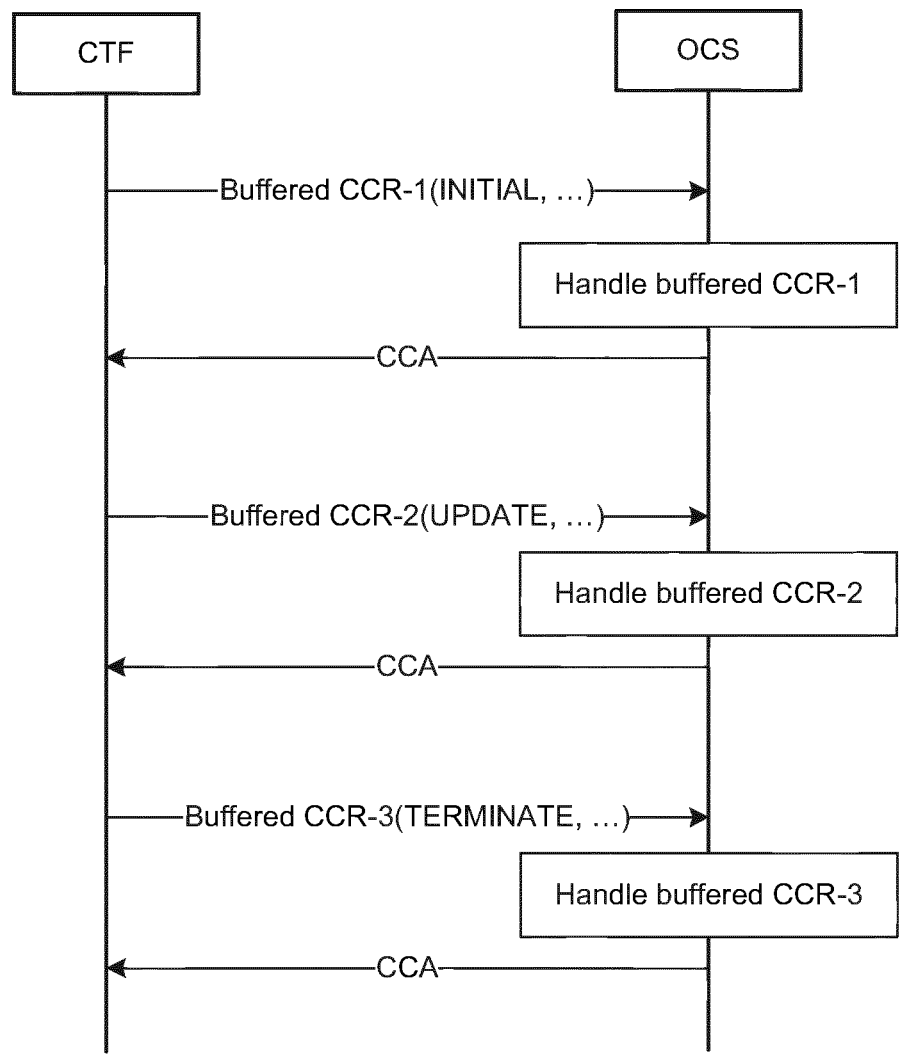
FIG. 2 shows signalling associated with a method according to an embodiment of the present invention.

The sequence of events for draining a CCR buffer at a CTF and for handling buffered CCR requests at an OCS is illustrated in FIG. 2.

The CCR buffer at the CTF is ideally configured as a First In First Out (FIFO) buffer, so that the sequence of generated CCR requests that belong to the same session is maintained. The CTF first sends the initial CCR-1 to the OCS. Advantageously, all the transmitted CCR requests include an indication that the transmitted information has been buffered, and does therefore not represent a real-time request. The OCS handles the received CCR requests and checks the subscriber's credit balance. Irrespective of the outcome of the balance check, a CCA reply indicating approval of the request is transmitted to the CTF.

The operator may advantageously implement an OCS policy that retroactively updates the subscriber's credit balance in accordance with the received buffered CCR requests, which reflect the subscriber's prior service and infrastructure use. Such a policy allows the operator to recover at least some of his revenue when the Ro interface is down, while at the same time ensuring that the offered services remain available. Other policies may be implemented in order to account for the subscriber's use.

The CTF does not take further action on the received CCA, as the session has already been granted earlier. The remaining buffered CCR information is handled in a similar manner.

In a preferred embodiment of the present invention, the transmission of the CONTINUE_BUFFER indication is implemented using the Credit-Control-Failure Handling (AVP Code 427) AVP, as defined in RFC 4006. The AVP is returned to the CTF in the CCA sent from the CCS and is of type 'enumerated', taking on the following possible values:

| | |
|---|---|
| TERMINATE | 0; |
| CONTINUE | 1; |
| RETRY_AND_TERMINATE | 2; |
| CONTINUE_BUFFER | 3. |

In an alternative embodiment of the present invention, the transmission of the CONTINUE_BUFFER indication is implemented using the Experimental-Code-AVP defined in RFC 3588. Similarly, a Non-Real-Time-CCR AVP may be added in order to transmit the indication that a CCR transmitted from the CTF to the OCS has been previously buffered, and represents non real-time CCR information.

Figure 3:
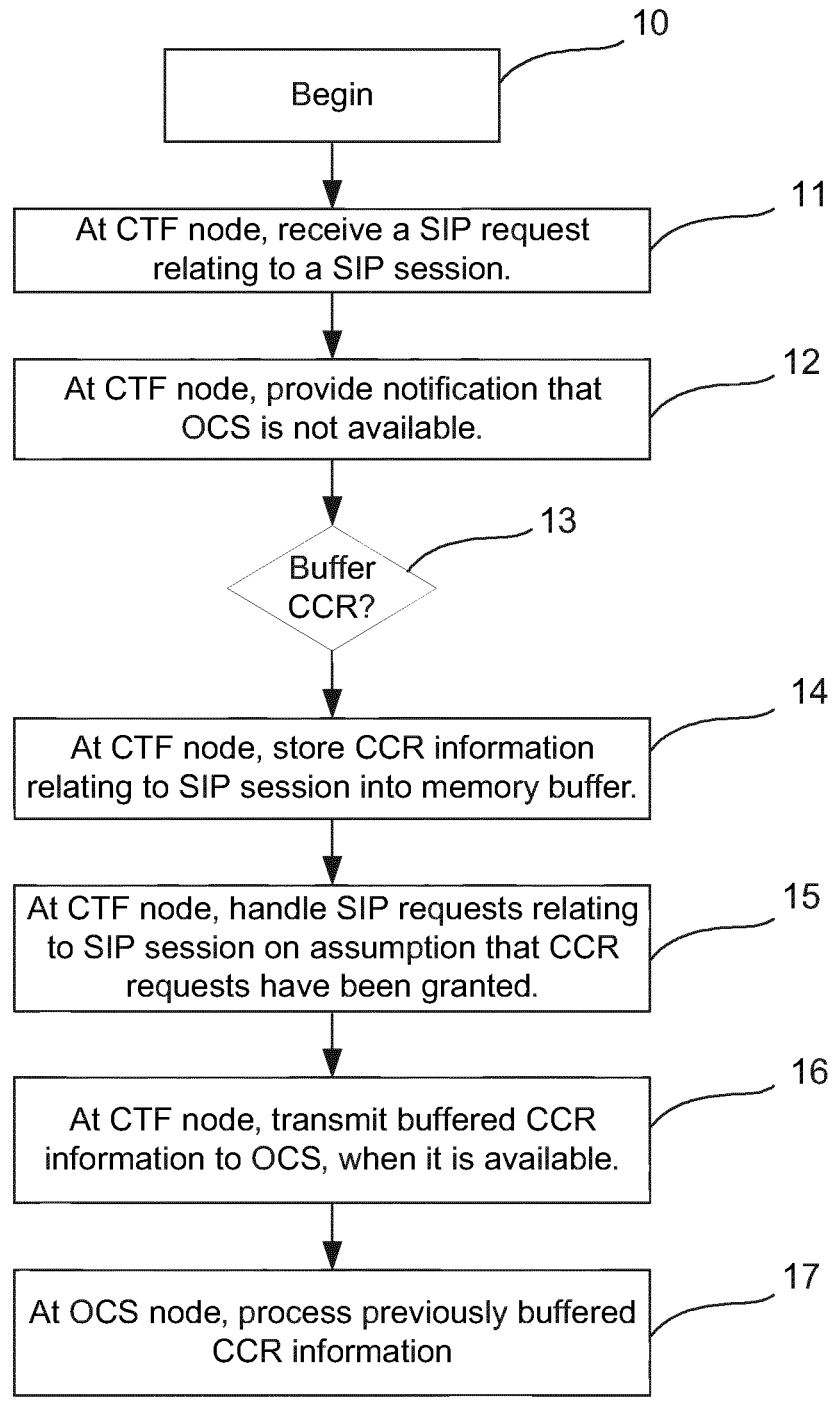
FIG. 3 is a flow diagram illustrating steps of a method according to an embodiment of the present invention.

FIG. 3 illustrates the main steps of the method according to the present invention in a flowchart, corresponding to the sequence diagram of FIGS. 1 and 2. The method starts at Step 10. At Step 11, a CTF node receives a SIP request relating to a SIP session. At Step 12, a notification that an OCS service node is unavailable is provided at the CTF node. At Step 13, the CTF checks whether the notification includes an indication that CCR requests relating to the SIP session are to be buffered, and that the corresponding SIP requests should be handled on the assumption that the related CCR requests have been granted. If such an indication is present, the CTF stores the CCR information relating to said SIP session into a memory buffer in Step 14. In Step 15, the CTF node handles SIP requests that relate to the SIP session on assumption that the related CCR requests have been granted. Once the OCS service node is available again, the CTF node transmits in Step 16 the buffered CCR information to the OCS. Finally, in Step 17, the OCS node processes the previously buffered CCR information, which has been received from the CTF.

Figure 4:
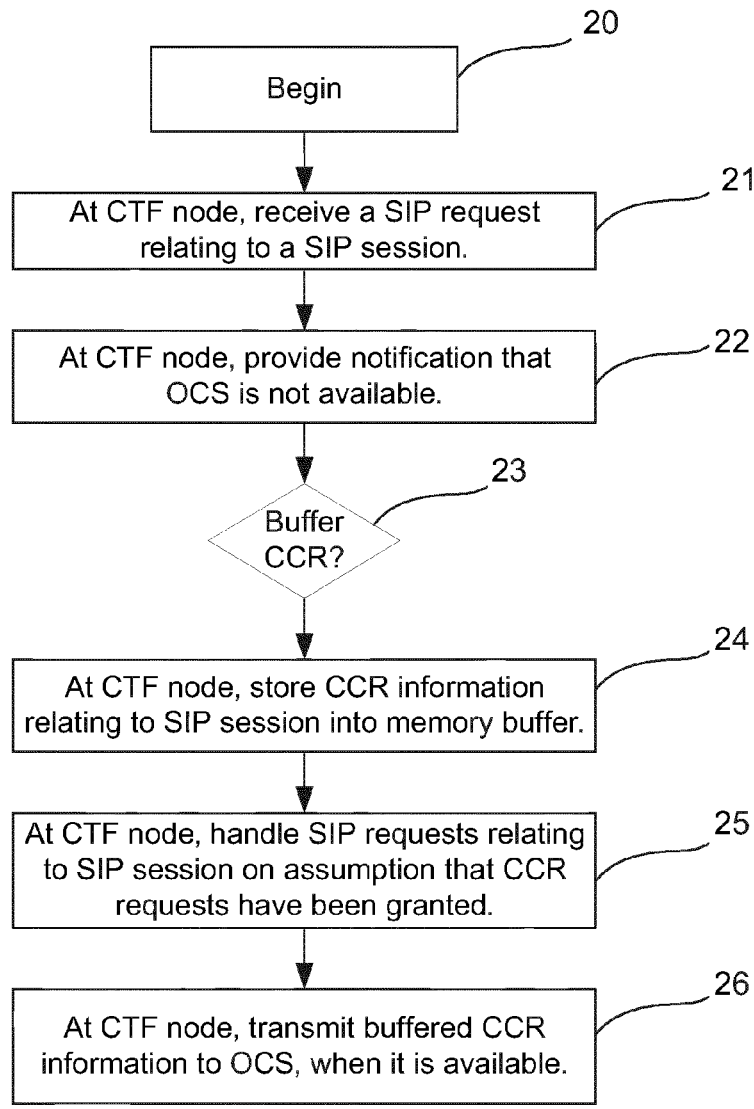
FIG. 4 is a flow diagram illustrating steps of a method according to an embodiment of the present invention.

FIG. 4 illustrates the main steps of the method implemented in one embodiment by a CTF node, such as the CTF node depicted in FIGS. 1 and 2. The method starts at Step 20. At Step 21, the CTF node receives a SIP request relating to a SIP session. At Step 22, a notification that an OCS service node is unavailable is provided at the CTF node. At Step 23, the CTF checks whether the notification includes an indication that CCR requests relating to the SIP session are to be buffered, and that the corresponding SIP requests should be handled on the assumption that the related CCR requests have been granted. If such an indication is present, the CTF stores the CCR information relating to said SIP session into a memory buffer in Step 24. In Step 25, the CTF node handles SIP requests that relate to the SIP session on assumption that the related CCR requests have been granted. Once the OCS service node is available again, the CTF node transmits in Step 26 the buffered CCR information to the OCS.

Figure 5:
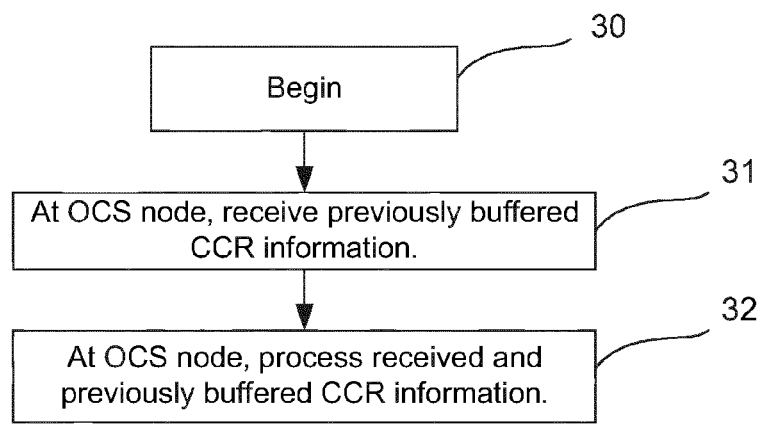
FIG. 5 is a flow diagram illustrating steps of a method according to an embodiment of the present invention.

FIG. 5 illustrates the main steps of the method implemented in one embodiment by an OCS node, such as the OCS node depicted in FIGS. 1 and 2. The method starts at Step 30. At Step 31, the OCS node receives a CCR request containing CCR information that was previously buffered at a CTF. In Step 32, the OCS node processes the previously buffered CCR information, which has been received from the CTF.

Figure 6:
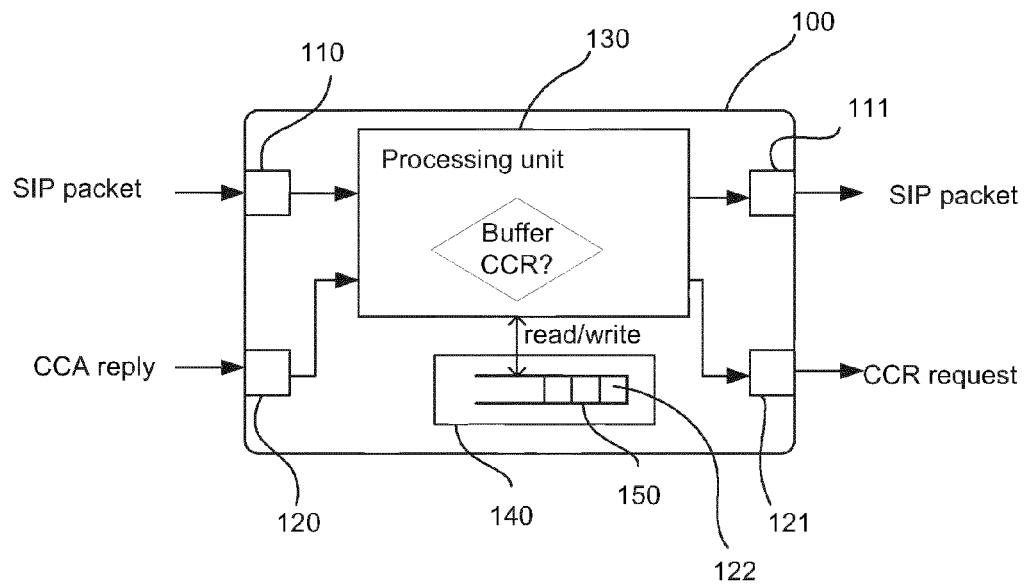
FIG. 6 illustrates schematically an embodiment of an apparatus implementing a CTF node.

FIG. 6 schematically illustrates an embodiment of an IMS node 100 according to the present invention. The node is configured to operate as Charging Triggering Function (CTF). This provides the functionality of the CTF node in FIGS. 1 and 2. The node 100 comprises at least a first receiving unit 110 for receiving SIP packets from an S-CSCF, a UE or an AS, and a first sending unit 111 for sending SIP packets. The node 100 further comprises at least a second receiving unit 120 for receiving DIAMETER CCA replies from an OCS node, and a second sending unit 121 for sending DIAMETER CCR requests to an OCS node. The node 100 further comprises a processing unit 130 and a memory 140, wherein the processing unit 130 is configured to generate CCR information corresponding to a received SIP request and relating to a SIP session. The processing unit is further configured to check whether a notification is available at the node 100, indicating that an OCS service is not available and indicating that CCR requests related to the SIP session that should be transmitted to said OCS should instead be buffered in an buffer area 150 of said memory. The processing unit 130 is further configured to store a generated CCR request 122 in the buffer memory 150, if said notification is provided. The processing unit 130 processes incoming SIP requests relating to the SIP session on the assumption that the related CCR requests are granted. Furthermore, the processing unit 130 is configured to read the buffered CCR request information 122 from the buffer memory 150, and to transmit it in at least one CCR request to an OCS node, once it becomes available. Advantageously, the processing unit indicates in the outgoing CCR request that the contained CCR request information has been buffered.

Figure 7:
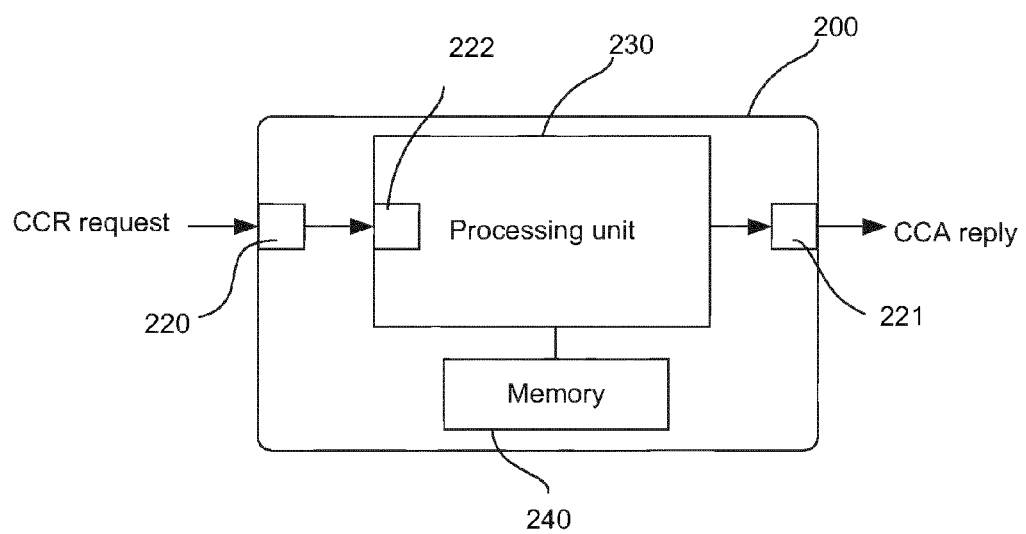
FIG. 7 illustrates schematically an embodiment of an apparatus implementing an OCS node.

FIG. 7 schematically illustrates an embodiment of an IMS node 200 according to the present invention. The node 200 is configured to operate as an Online Charging Service (OCS). This provides the functionality of the OCS node in FIGS. 1 and 2. The node 200 comprises at least a receiving unit 220 for receiving DIAMETER CCR requests from a CTF node, and second sending unit 221 for sending DIAMETER CCA answers to a CTF node. The node 200 further comprises a processing unit 230 and a memory 240, wherein the processing unit is configured to process CCR information that is received in a CCR request comprising non real-time CCR information, which has previously been buffered. Advantageously the processing unit is configured to generate a CCA reply that informs a CTF node that the OCS service is unavailable, and that the CTF node should buffer CCR requests.

Memories 140, 240 store instructions for processing by the respective processing units 130, 230. Each node 100, 200 may be considered as a computer configured to act as described by processing the corresponding stored instructions.

It will be appreciated by the person skilled in the art that various modifications may be made to the above described embodiments without departing from the scope of the present invention.

The invention claimed is:

1. A method of communication between two nodes providing online charging functionalities in an IP Multimedia Subsystem(IMS) network, wherein a first node is configured to operate as a Charging Triggering Function (CTF) and wherein a second node is configured to operate as an Online Charging Service (OCS), the method comprising:
   at the CTF node, receiving a Session Initiation Protocol (SIP) request relating to a SIP session from a network node, wherein the CTF node attempts to initiate the online charging functionalities between the CTF node and the OCS node responsive to the SIP request by sending a Credit Control Request (CCR) request to the OCS node;
   at the CTF node, receiving a notification by a Credit Control Answer (CCA) reply indicating that the OCS node is not available to provide the online charging functionalities, responsive to the CCR request sent from the CTF node to the OCS node, wherein the notification comprising an indication that the CCR request should be buffered;
   at the CTF node, when said notification comprises the indication that the CCR request should be buffered:
      storing CCR information that corresponds to the CCR request in a memory buffer;

handling said SIP session by allowing the SIP session, based on an assumption that the CCR request has been granted by the OCS node;

transmitting said buffered CCR information to said OCS node after being notified that the OCS node is available to perform the online charging functionalities; and at the OCS node, processing said previously buffered CCR information.

2. A method of handling a Session Initiation Protocol (SIP) request at an IP Multimedia Subsystem (IMS) node configured to operate as a Charging Triggering Function (CTF), the method comprising:

receiving the SIP request relating to a SIP session from a network node at the CTF, wherein the CTF attempts to initiate an online charge service between the CTF and an Online Charging Service (OCS) responsive to the SIP request, by having the CTF send a Credit Control Request (CCR) request to the OCS;

receiving a notification by a Credit Control Answer (CCA) reply indicating that the OCS is not available to provide the online charge service, responsive to the CCR request being sent to the OCS, wherein the notification comprising an indication that the CCR request should be buffered; and when said notification comprises the indication that the CCR request should be buffered;

storing CCR information that corresponds to the CCR request in a memory buffer;

handling the SIP request by allowing the SIP session, based on an assumption that said CCR request has been granted by the OCS; and transmitting said buffered CCR information to said OCS after being notified that the OCS is available to perform the online charge service.

3. A method of handling a Credit Control Request (CCR) request at an IP Multimedia Subsystem (IMS) network node configured to operate as an Online Charging Service (OCS), the method comprising:

sending a notification by means of a Credit Control Answer (CCA) reply to a Charging Triggering Function (CTF) indicating that the online charge service provided by the OCS is not available, the notification comprising an indication that the CCR request for the online charge service should be buffered;

receiving previously buffered CCR information from the CTF; and processing said previously buffered CCR information.

4. The method according to claim 1, wherein said notification of unavailability is transmitted from the OCS node to the CTF node.

5. The method according to claim 3, wherein said CCA reply comprises a "CONTINUE_BUFFER" indication.

6. The method according claim 1, wherein said buffered CCR information is transmitted in at least one CCR request including an indication that the information has been buffered.

7. An apparatus comprising a first node configured to operate as a Charging Triggering Function (CTF) in an IP Multimedia Subsystem (IMS) network, the apparatus comprising:

a first receiving unit for receiving Session Initiation Protocol (SIP) requests;

a second receiving unit for receiving Credit Control Answer (CCA) replies;

a first transmission unit for sending SIP messages;

a second transmission unit for sending Credit Control Request (CCR) requests;

a memory configured to buffer CCR information; and a processing unit coupled to the receiving units, the transmission units and the memory and configured to process a SIP request for a SIP session by sending a CCR request for online charge service to an Online Charging Service (OCS), wherein a notification by a Credit Control Answer (CCA) reply is received at the CTF, responsive to the CCR request, when the OCS fails to grant the CCR request to provide the online charge service and wherein the notification comprising an indication that the CCR request should be buffered, and when the notification is provided that the CCR request should be buffered, the processing unit to:

store CCR information that corresponds to the CCR request in said buffer;

handle the SIP request by allowing the SIP session, based on an assumption that said CCR request is granted by the OCS; and read said CCR information from said buffer and transmit said CCR information in at least one CCR request to said OCS for the online charge service when the OCS is available to perform the online charge service.

8. The apparatus according to claim 7, wherein the processing unit is further configured to include in said at least one CCR request comprising buffered CCR information, which is transmitted to said OCS, an indication that the buffered CCR information has been buffered.

9. An apparatus comprising a second node configured to operate as an Online Charging Service (OCS) in an IP Multimedia Subsystem (IMS) network, the apparatus comprising:

a receiving unit for receiving Credit Control Request (CCR) requests;

a transmission unit for sending Credit Control Answer (CCA) replies;

a memory; and a processing unit, coupled to the receiving unit, the transmission unit and the memory, configured to:

transmit by means of a CCA reply, a notification of unavailability to a CCR request received from a Charging Triggering Function (CTF), wherein the notification comprises an indication that the CCR request for an online charge service should be buffered; and process a buffered CCR request received from the CTF to perform the online charge service, in which the buffered CCR request comprises an indication that the buffered CCR request was buffered by said CTF.

10. The apparatus according to claim 7, wherein the CCA reply from the OCS comprises a "CONTINUE_BUFFER" indication.

11. The method according to claim 2, wherein said notification of unavailability is transmitted from the OCS to the CTF.

12. The method according claim 2, wherein said buffered CCR information is transmitted in at least one CCR request including an indication that the information has been buffered.

13. The method according claim 3, wherein said buffered CCR information is transmitted in at least one CCR request including an indication that the information has been buffered.

* * * * *